UNITED STATES PATENT OFFICE 2,509,599

THERMAL INSULATING CEMENT

Frederick H. Hollenberg, Jr., Kankakee, Ill., assignor to Baldwin-Hill Company, Trenton, N. J., a corporation of New Jersey No Drawing. Application January 10, 1949, Serial No. 70,149

9 Claims. (Cl. 106—14)

The present invention relates to insulating material capable of withstanding high temperatures and, more particularly, it relates to thermal insulating material containing mineral wool and possessing corrosion-resistant and other desirable properties. The present application is a continuation-in-part of Application Serial No. 666,520 filed May 1, 1946 (now abandoned).

The use of mineral wool and the like in compositions for the purpose of producing insulating materials capable of resisting high temperatures has found acceptance by the trade in recent years. Such products usually comprise a mixture of heat-resistant fibrous materials, such as mineral wool and asbestos, and an inorganic binder such as clay, hydraulic cement, sodium silicate, and the like. The mixture of the materials is customarily supplied in the dry loose form and is mixed with water at the time of its use to form a wet plastic mass or cement that can be readily applied to metal and other surfaces by hand or with a trowel. The wet mass dries or sets in a period varying from several hours to several days, depending upon the environment and conditions of application, to form a hard mass or blanket of the insulating material adhering to the surface.

A cement of this type possesses the characteristic of low shrinkage during the drying or setting stage and this is important in order to provide a continuous insulating blanket without cracks or fissures which will remain of substantially constant thickness during drying. The material upon setting possesses the requisite properties which make it valuable as an insulating material, particularly where resistance to heat is desired. For example, the material is a good thermal insulator, is light in weight, and is characterized by good mechanical strength so it resists abrasion and vibration. Furthermore, the material is relatively impervious to moisture so that an environment of high humidity will not deleteriously affect the applied blanket.

Insulating materials of the type described find many uses in the industries and may be employed to resist the outward flow of heat from heated vessels or to resist the inward flow of heat into cold vessels. The temperature to which the material is subjected will, of course, depend on the particular use thereof and the material is usable at temperatures as high as 1200° F. and higher.

Several problems are encountered in the application of a mineral wool cement. In the first place, the moisture content of the cement is responsible for corrosion of the metal surface to which it is applied; that is to say, during the period when the cement is drying out considerable corrosion develops. Furthermore, the corrosion may increase on subsequent exposure of the cement blanket to a humid atmosphere, due to the combined action of the oxygen and moisture in the air which penetrate through the somewhat porous cement blanket and reach the metal surface. A second problem frequently encountered is the reduction in adhesion resulting from the corrosion or from the presence in the cement of anti-corrosion reagents. In some instances, the corrosion of the metal surface may produce a temporary adhesion due to the pitting thereof, but usually when the corrosion proceeds to any substantial extent there is a tendency for the adhesion to drop sharply. While various corrosion inhibitors have been suggested for use in the cement, these, as a general rule, substantially reduce the adhesion between the cement blanket and the metal surface.

One object of the present invention is to provide thermal insulating material of the mineral wool type which possesses corrosion-resistant and other desirable properties.

Another object of the invention is to provide a thermal insulating material that has improved adhesion when applied to a surface, as compared to prior products of the same general type.

A further object of the invention is to provide a cement product characterized by resistance to high temperature, low shrinkage, and high covering power.

Still another object is to provide a thermal insulating material which comprises, in addition to mineral wool and an inorganic binder, a corrosion inhibitor and a reagent that produces improved adhesion.

Other objects will be apparent from a consideration of this specification and the claims.

In its broader aspects, the product of the present invention in the form of a loose dry mixture adapted to be mixed with water and used as a thermal insulating cement, comprises inorganic fibrous material including mineral wool, an inorganic binder therefor, and a small proportion of sodium oxalate, the last named compound serving to render the composition corrosion-resistant. The term "mineral wool" is employed generically to include the artificial wool-like materials obtained by the fiberization of molten slag, glass, and like silica-containing material. Advantageously, as is usually the case with products of the same general class, the cement composition of the present invention will include asbestos fibre in order to provide improved fibre strength. If asbestos fibre is included in the composition, the preponderant portion of the inorganic fibrous material will nevertheless be the mineral wool fibres.

Referring to the material in the mixture which, upon the addition of sufficient water to form a plastic, pasty mass, serves as a binder for the insulating cement, it is as stated an inorganic material. In the product of the invention it exists in finely-divided solid form, for example, of a particle size less than about 30 mesh. The binding material in such insulating cement mixtures is of the class which absorbs water and becomes chemically associated therewith to lend plasticity to the wet mass, and which, upon standing, sets to a continuous binding phase. In other words, the dry, finely-divided material is hydrophillic and upon being mixed with water becomes solvated, that is, components of the material become surrounded by a zone of oriented water molecules forming a molecular complex with the water. As a result of this, as the wet insulating cement mass stands, the binder solidifies, even at ordinary temperatures, into a continuous phase serving to bind the various ingredients, including the mineral wool, and asbestos fibres if present, into a coherent mass.

Inorganic materials which possess these properties are compounds exhibiting binding properties when mixed with water and are selected from the group consisting of the hydrophillic, solvatable alkali metal and alkaline earth metal aluminates and silicates. As indicated previously, the term hydrophillic refers to the property of readily absorbing water, while the term solvatable refers to the property of forming molecular complexes with the absorbed water. Examples of hydrophillic, solvatable alkali metal and alkaline earth metal aluminates and/or silicates are clays such as bentonite, ball clays, kaolins, china clays, and the like; hydraulic cements such as natural cement, Portland cement, aluminous cement, and the like, and the alkali metal silicates such as the sodium silicates, potassium silicates, and the like. Preferably, bentonite makes up at least a portion of the binding material. Mixtures of such materials may be used if desired. Clays are generally complex mixtures of sodium, and potassium aluminum silicates containing small amounts of calcium and magnesium. The hydraulic cements contain mixtures of calcium aluminates and calcium silicates with varying amounts of magnesium. Portland cement, for example, is essentially a mixture of calcium aluminate and calcium silicate, while aluminous cement is essentially calcium aluminate. A particularly advantageous aluminous cement is one produced by the Universal Atlas Cement Company known as "Lumnite." This cement analyzes about 36.8% calcium oxide, about 41% alumina plus titanium dioxide, and minor amounts of silica and magnesia. Sodium and potassium silicates, the so-called "soluble glasses," are complex compounds containing varying proportions of sodium oxide or potassium oxide and silica. In all of the above-mentioned materials, the silicate or aluminate components become surrounded with a zone of oriented water molecules when the insulating cement mixture is mixed with sufficient water to form a plastic mass, and as a result, the binder hardens upon standing to a continuous coherent binding phase, as distinguished from non-cohering individual particles.

Various other materials may be incorporated with the inorganic binding material to produce various effects. For instance, minor amounts of the common organic binding materials, such as synthetic resins, rosin, lignins, molasses and the like, may be incorporated with the mixture to supplement the binding properties of the inorganic binder described above. Moreover, finely-divided, inert filling materials such as pulverized silica, diatomaceous earths, pigments, and the like may be mixed with the binder. Furthermore, especially in the case where a hydraulic cement is selected as the inorganic binder, puzzalonic materials such as volcanic ash, finely-divided blast furnace slags, and the like, may be added thereto to increase the final strength of the applied product.

The relative amounts of the ingredients of the composition may be varied but the mineral wool, and asbestos if employed, and the inorganic binder will be used in an amount to give a product of the desired plasticity when mixed with water and to provide an insulating blanket of the desired strength and other properties. Usually, the mineral wool will be present in an amount between about 35% and about 65%, the asbestos when employed will usually be present in an amount between about 5% and about 20%, and the inorganic binder described will usually vary from about 5% to about 40%. Preferably, the range of these three ingredients will be as follows: mineral wool about 45% to about 55%, asbestos, if employed, about 10% to about 15%, and inorganic binder about 20% to 30%. While various grades of asbestos fibre may be used, it is advantageous to employ a well-fiberized or willowed product, for example, a good grade of Canadian chrysotile. The length of fibre may be also varied as desired and in general is governed by economic considerations. For instance, an economical form of asbestos fibres is known as the "floats" which is a very finely-divided fibrous form. However, it will be realized that the longer the fibres employed the greater the strength of the set product.

The amount of sodium oxalate present in the composition depends upon the amount of resulting improvement in the corrosion-resistance desired and an increase of corrosion-resistance is noted upon the addition of even a very small amount of the compound, for example 0.5%, although in this case some corrosion may develop over a period of days with continued exposure to moisture and oxygen. It is, therefore, usually desirable to increase the amount of sodium oxalate to the point where substantially complete resistance to corrosion is provided, and for this reason the use of about 2% to about 5% is recommended. Larger amounts, for example 6% to 10%, of sodium oxalate may be used if desired but the dilution effect of relatively large amounts of sodium oxalate may tend to change the other desirable properties of the product. In any event, the proportion employed is relatively small and is advantageously determined with the objective of providing a corrosion-resistant product without altering materially the basic character of the composition comprising the mineral wool and the inorganic binder.

In the preferred embodiment of the invention, there is also included a small amount of an agent which increases the pH value of the composition, examples of such reagents being the basic alkali metal and alkaline earth metal compounds such as hydrated high calcium lime, hydrated high magnesium lime, hydrated dolomitic lime, pulverized quicklime, barium hydroxide, sodium hydroxide, sodium phosphate, sodium carbonate, sodium bicarbonate, potassium hydroxide, potassium carbonate, lithium hydroxide, and the like. Such materials cooperate with the sodium oxalate in the reduction of the corrosion and when they are present in the composition, the amount of sodium oxalate employed may be reduced, if desired, for example about 10% to about 15% depending on the pH increasing reagent employed. It is, however, the use of the sodium oxalate as a corrosion-inhibiting agent in the composition which provides the unique results and this action cannot be compared to the slight reduction in corrosion which follows merely from the use of a pH increasing agent.

The amount of pH increasing agent employed also depends upon the amount of resulting improvement desired. Even a very small amount of the reagent, for example 0.2%, will have a beneficial effect, while the use of substantially larger amounts, for example about 1% to about 4% results in a marked increase in the pH value and generally the amount used will fall within this range. The use of larger amounts, for example 5% to 10%, while beneficial from the standpoint of the pH value, are usually not employed since they tend to reduce the other desirable properties as a result of the dilution effect on the other constituents.

Of the pH increasing reagents available for use, a hydrated lime possesses especially advantageous properties and is, therefore, the preferred reagent. It has been pointed out that anti-corrosion agents tend to decrease the adhesion properties of the dried and set cement and this is true to some extent also in the case of sodium oxalate. When a hydrated lime is employed in the composition, however, not only is the pH increased but also the reduction in adhesion due to the presence of the sodium oxalate is overcome. In fact, the hydrated lime imparts superior adhesion characteristics to the final insulating blanket. The hydrated lime is effective in small amounts and the statements made with respect to amount of pH increasing reagents generally are also applicable when hydrated lime is added to increase the pH value and to impart the desired adhesion to the set cement.

The hydrated lime may be a high calcium lime, a dolomitic lime or a high magnesium lime. The use of a high calcium lime is preferred, however, since the adhesion characteristics are more marked in the case of such a lime.

The hydrated lime may be added as such or quicklime may be added and reliance placed on the water with which the dry product is mixed to convert the quicklime into the hydrated product. Thus the term "lime" as used in the claims will be understood to include both quicklime and hydrated lime.

If desired, a small amount, for example 0.1% to 3% of a material which increases the workability of the composition may be included therein. These materials increase the plasticity of the moist cement and decrease its tendency to bleed water. Examples of such materials are a sodium alkyl sulphonate, sodium lauryl sulphate, dihexyl, diamyl or dibutyl sodium sulphosuccinate, or isopropyl naphthalene sodium sulphonate.

The following examples are given for the purpose of illustration and are typical of the compositions of the present invention:

Example 1

| | Per cent |
|---|---|
| Mineral wool | 56 |
| Bentonite | 30 |
| Asbestos | 10 |
| Sodium oxalate | 4 |

Example 2

| | Per cent |
|---|---|
| Mineral wool | 54 |
| Bentonite | 30 |
| Asbestos | 10 |
| Sodium oxalate | 3 |
| Sodium carbonate | 3 |

Example 3

| | Per cent |
|---|---|
| Mineral wool | 55 |
| Bentonite | 30 |
| Asbestos | 10 |
| Sodium oxalate | 3 |
| High calcium hydrated lime | 2 |

Example 4

| | Per cent |
|---|---|
| Glass wool | 55 |
| Asbestos | 10 |
| Bentonite | 10 |
| Kaolin | 20 |
| Sodium oxalate | 5 |

Example 5

| | Per cent |
|---|---|
| Rock wool | 35 |
| Asbestos (Canadian crysotile) | 18 |
| Bentonite | 20 |
| Portland cement | 20 |
| Sodium oxalate | 5 |
| High calcium hydrated lime | 2 |

Example 6

| | Per cent |
|---|---|
| Rock wool | 47 |
| Bentonite | 20 |
| Natural cement | 10 |
| Sodium oxalate | 3 |
| Long fibred asbestos | 5 |
| Short fibred asbestos | 15 |

Example 7

| | Per cent |
|---|---|
| Rock wool | 53 |
| Asbestos fibre | 10 |
| Sodium silicate | 10 |
| Asbestos ("floats") | 20 |
| Sodium oxalate | 5 |
| Hydrated lime | 2 |

The cement products of the invention are mixed with sufficient water in accordance with the usual practice to form a plastic cement mix and applied in any desired manner to the surfaces to be insulated. The cement is then permitted to dry and set to form the insulating blanket possessing the desirable properties described.

Considerable modification is possible in the proportions of ingredients present in the composition without departing from the essential features of the invention.

I claim:

1. A composition in the form of a loose dry mixture adapted to be mixed with water and used as a thermal insulating cement comprising inorganic fibrous material including mineral wool in an amount between about 35% and about 65%, an inorganic binder therefor selected from the group consisting of the hydrophillic, solvatable alkali metal and alkaline earth metal silicates and aluminates in an amount between about 5% and about 40%, and between about 2% and about 5% of sodium oxalate, at least the preponderant proportion of said fibrous material being said mineral wool.

2. The composition of claim 1, wherein the binder comprises bentonite.

3. A composition in the form of a loose dry mixture adapted to be mixed with water and used as a thermal insulating cement comprising inorganic fibrous material including mineral wool in an amount between about 35% and about 65% and asbestos fibre in an amount between about 5% and about 20%, an inorganic binder therefor selected from the group consisting of the hydrophillic, solvatable, alkali metal and alkaline earth metal silicates and aluminates in an amount between about 5% and about 40%, and between about 2% and about 5% of sodium oxalate.

4. The composition of claim 3 wherein the binder comprises bentonite.

5. A composition in the form of a loose dry mixture adapted to be mixed with water and used as a thermal insulating cement comprising inorganic fibrous material including mineral wool in an amount between about 35% and about 65%, at least the preponderant proportion of said fibrous material being said mineral wool, an inorganic binder therefor selected from the group consisting of the hydrophillic, solvatable alkali metal and alkaline earth metal silicates and aluminates in an amount between about 5% and about 40%, between about 2% and about 5% of sodium oxalate, and between about .2% and about 4% of an alkaline material selected from the group consisting of basic alkali metal and alkaline earth metal compounds.

6. The composition of claim 7 wherein the alkaline material is lime and is present in an amount between about 1% and about 4%.

7. The product of claim 6 wherein the lime is hydrated high calcium lime.

8. A composition in the form of a loose dry mixture adapted to be mixed with water and used as a thermal insulating cement comprising inorganic fibrous material including mineral wool in an amount between about 35% and about 65% and asbestos in an amount between about 5% and about 20%, between about 5% and about 40% of a binder therefor comprising bentonite, between about 2% and about 5% of sodium oxalate, and between about .2 and about 4% of lime.

9. The composition of claim 8 wherein the lime is hydrated high calcium lime and is present in an amount between about 1% and about 4%.

FREDERICK H. HOLLENBERG, Jr.

REFERENCES CITED

The following references are of record in the file of this patent:

UNITED STATES PATENTS

| Number | Name | Date |
| --- | --- | --- |
| 1,944,008 | Hobart | Jan. 16, 1934 |
| 2,497,581 | Smith et al. | Sept. 10, 1946 |

Certificate of Correction

Patent No. 2,509,599                                                                    May 30, 1950

FREDERICK H. HOLLENBERG, Jr.

It is hereby certified that errors appear in the printed specification of the above numbered patent requiring correction as follows:

Column 8, line 6, for the claim reference numeral "7" read 5; line 20, for ".2" read .2%;

and that the said Letters Patent should be read with these corrections therein that the same may conform to the record of the case in the Patent Office.

Signed and sealed this 26th day of September, A. D. 1950.

[SEAL]

THOMAS F. MURPHY,
                                                                    *Assistant Commissioner of Patents.*